(12) United States Patent
Zuehl

(10) Patent No.: US 7,201,261 B2
(45) Date of Patent: Apr. 10, 2007

(54) BRIDGING CLUTCH FOR A HYDRODYNAMIC CLUTCH DEVICE ENCLOSED BY A HOUSING

(75) Inventor: Carsten Zuehl, Saltillo (MX)

(73) Assignee: ZF Friedrichshafen AG, Friedrichshafen (DE)

( * ) Notice: Subject to any disclaimer, the term of this patent is extended or adjusted under 35 U.S.C. 154(b) by 142 days.

(21) Appl. No.: 11/040,543

(22) Filed: Jan. 21, 2005

(65) Prior Publication Data

US 2005/0199461 A1    Sep. 15, 2005

(30) Foreign Application Priority Data

Mar. 12, 2004   (DE)   ............... 10 2004 012 145

(51) Int. Cl.
*F16H 45/02* (2006.01)
(52) U.S. Cl. .................................... 192/3.29
(58) Field of Classification Search ............... None
See application file for complete search history.

(56) References Cited

U.S. PATENT DOCUMENTS

| | | | | |
|---|---|---|---|---|
| 3,130,828 A | * | 4/1964 | Maurice | 192/70.18 |
| 4,177,885 A | | 12/1979 | Ross | |
| 4,353,444 A | * | 10/1982 | Bionaz | 192/3.29 |
| 5,826,690 A | | 10/1998 | Maingaud et al. | |
| 6,065,577 A | * | 5/2000 | Arhab et al. | 192/70.18 |
| 6,293,380 B1 | * | 9/2001 | Arhab | 192/3.29 |
| 6,332,516 B1 | * | 12/2001 | Arhab | 192/3.29 |
| 6,827,187 B2 | * | 12/2004 | Sasse | 192/3.29 |
| 6,851,531 B2 | * | 2/2005 | Sasse | 192/3.29 |

FOREIGN PATENT DOCUMENTS

WO    WO 02/063186 A1 *  8/2002

* cited by examiner

*Primary Examiner*—Rodney H. Bonck
(74) *Attorney, Agent, or Firm*—Cohen Pontani Lieberman & Pavane LLP

(57) ABSTRACT

A bridging clutch for a hydrodynamic clutch device includes a housing comprising a cover having a friction surface; a piston which can move axially with respect to the housing, the piston having a friction surface which faces the friction surface of the cover; a first pretensioning element mount fixed to the cover and having a first support section; a second pretensioning element mount fixed to the piston and having a second support section; and a pretensioning element supported axially between the first and second support sections for actuating the piston in a predetermined axial direction. A slide device located between the pretensioning element and the second support section permits sliding movement of the pretensioning element with respect to the second pretensioning element mount.

21 Claims, 9 Drawing Sheets

BRIDGING CLUTCH FOR A HYDRODYNAMIC CLUTCH DEVICE ENCLOSED BY A HOUSING

BACKGROUND OF THE INVENTION

1. Field of the Invention

The invention pertains to a bridging clutch for a hydrodynamic clutch device enclosed by a housing having a friction surface, a piston which can move axially with respect to the housing, the piston having a friction surface which faces the friction surface of the housing, and a pretensioning element supported axially between the piston and the housing for actuating the piston in a predetermined axial direction.

2. Description of the Related Art

A bridging clutch for a hydrodynamic clutch device provided with a plurality of disks to form friction surfaces between a cover of the housing of the hydrodynamic clutch device and a piston is known from U.S. Pat. No. 4,177,885. The piston is mounted nonrotatably but with freedom of axial movement by way of its base on the hub of a turbine wheel and is subjected to pretension in the direction toward the disks by a pretensioning element in the form of an axial spring, which is supported against the turbine hub and thus against a component of the hydrodynamic clutch device.

When the bridging clutch is subjected to positive pressure in the hydrodynamic circuit and thus in the area between the turbine wheel and the piston, the piston makes contact with the disks and thus activates the bridging clutch. During this process, which is referred to as "engagement" in the art, the pretensioning element assists the movement of the piston, as a result of which the engaging operation can be accelerated and can also be accomplished even if the difference between the pressure in the hydrodynamic circuit and that in the pressure space located axially between the piston and the cover of the housing is very small. If the bridging clutch is to be disengaged, however, which is accomplished by means of a positive pressure in the pressure space with respect to the hydrodynamic circuit, the piston must be moved against the force of the pretensioning element toward the turbine wheel. Although this movement of the piston, referred to as "disengagement" in the art, must be accomplished against the force of the pretensioning element, the increased difficulty of performing the disengaging operation thus caused is tolerated in view of the advantages associated with the engaging operation.

The arrangement of the pretensioning element on the turbine hub and thus at a location far inside the disks in the radial direction is likely to be problem in the bridging clutch according to U.S. Pat. No. 4,177,885, in the sense that the pretensioning element must act on the disks via the piston, which thus serves as a speed reducer. If the piston has elasticity in the axial direction, furthermore, the axial force exerted by the pretensioning element is transmitted to the disks in such a way that the disks are subjected to uneven load. It is therefore impossible to avoid the at least partial premature wear of the disks.

Another disadvantage of this bridging clutch is to be found in its axial connection to the turbine wheel by way of the pretensioning element. Axial displacements of the turbine wheel, such as those which occur during the transition between push and pull phases, for example, are accordingly transmitted via the pretensioning element to the piston and thus influence the function of the bridging clutch.

U.S. Pat. No. 5,826,690 discloses a bridging clutch having a plurality of tangential leaf springs, which are attached at one end to the cover of the housing of a hydrodynamic clutch device and at the other end to the piston, where the latter attachment is achieved by means of lock-ring or collar bolts, which offer the advantage that the tangential leaf springs can be attached to the piston from a certain side during the assembly procedure. The tangential leaf springs, however, serve only to connect the piston nonrotatably to the cover and thus to the housing of the hydrodynamic clutch device; they do not exert any pretension in a predetermined direction.

As a result of the absence of an axially operative pretensioning element, there is the problem that bridging clutches of this type take a comparatively long time to react during the clutch-engaging operation, this reaction time being easily on the order of 300–600 ms. It is often desirable, however, to have a much shorter engagement time on the order of, for example, approximately 150 ms. Another disadvantage is to be found in the loss of ability to control the piston, because, when the piston is disengaged, its position can be unstable if there is only a small pressure difference between the pressure space and the hydrodynamic circuit. A considerable amount of effort is required to compensate for this situation, to the extent that it can be compensated at all. An instability of this type can have the effect that the piston is shifted abruptly and undesirably in the engaging direction, which can be perceived negatively in the vehicle as a jerk.

SUMMARY OF THE INVENTION

The invention is based on the task of designing a bridging clutch for a hydrodynamic clutch device in such a way that an axially operative pretensioning element introduces its axial force over a short distance into at least one friction surface in such a way that this force is exerted uniformly on the friction surface.

According to the invention, the pretensioning element is supported between a first pretensioning element mount fixed to the cover and a second pretensioning element mount fixed to the piston, a slide device being located between the pretensioning element and the second mount for permitting sliding movement of the pretensioning element with respect to the second mount.

By locating the pretensioning element in the area of the friction surface or immediately adjacent thereto, very short routes can be obtained between at least one pretensioning element and at least one friction surface of the bridging clutch in the hydrodynamic clutch device. In cases where the friction surface is installed axially between the cover of the housing of the hydrodynamic clutch device and the piston of the bridging clutch, the pretensioning element and the friction surface can be brought very close together by locating the pretensioning element as well as the friction surface axially between the cover and the piston. In an arrangement of this type, the pretensioning element can be either radially inside or radially outside the friction surface, so that no axial space goes to waste; the pretensioning element will thus be in an area of the housing in which no component would otherwise be present.

According to the invention, one side of the pretensioning element is supported against a component support section of a first pretensioning element mount, which is attached to the cover of the housing; and the other side of the pretensioning element is supported against a piston support section of a second pretensioning element mount, which is attached to the piston. When installed in this way, the pretensioning element occupies a position on the first pretensioning element mount which is essentially stationary with respect to the housing, whereas an axial force can be exerted directly on the piston by way of the second pretensioning element mount. If the two pretensioning element mounts are located essentially in the axial area of the friction surface, but with a radial offset from it, the waste of axial space is avoided. If there is a slight radial offset between the pretensioning element mounts, i.e., between the component support section of the one and the piston support section of the other, from the friction surface, the force exerted by the pretensioning element must be transmitted via the piston only over a very short distance to the friction surface, so that any elasticity of the piston will not lead to a perceptible, uneven exertion of force on the friction surface. The formulation "at least one friction surface" used in the claim implies that there can be only one friction surface between the cover of the housing and the piston but also that there could be a plurality of friction surfaces here. In the former case, at least one of the two previously mentioned components, i.e., the cover or the piston, can be provided with a friction lining, so that the friction surface will be present between the friction lining and the other component. A bridging clutch with only one friction surface is referred to in professional circles as a "single CC", where CC stands for "converter clutch".

For the transmission of higher torques, however, it is common practice to use bridging clutches with several friction surfaces, where in the conventional case at least one disk is provided axially between a first friction surface assigned to the piston and a second friction surface assigned to the cover of the housing. When several disks are used between these two friction surfaces, an intermediate disk is always interleaved between them. All of the disks and/or intermediate disks can be provided with friction linings. By increasing the number of disks or intermediate disks, the number of friction surfaces of the bridging clutch is also increased.

In the case of a dual CC or a quadruple CC, the piston is usually supported against the cover side and is connected nonrotatably to the cover as in, for example, the dual CC described in U.S. Pat. No. 5,826,690. In the case of a single CC or triple CC, however, the piston is often supported on the turbine hub of the turbine wheel, as is realized in the previously mentioned U.S. Pat. No. 4,177,885, which describes a triple CC.

Because a nonrotatable connection of the piston to the turbine wheel will result in relative movement between the cover and the piston in the circumferential direction, this relative movement acts via the two pretensioning element mounts, i.e., the component support section on one side and the piston support section on the other side, on the pretensioning element located axially between them. For this reason, the pretensioning element according to the invention is provided with a slide device, by means of which relative movement between the two pretensioning element mounts can be accepted with minimal friction and essentially without wear. This slide device is preferably produced out of a material such as Teflon or Vespel with favorable low-friction properties.

The pretensioning element advantageously comprises a plurality of spring elements, which are either attached to the component support section of the first pretensioning element mount or form an integral part of that section. In the former case, the spring elements preferably extend at a tangent to an axis of rotation of the housing, and each accepts its own separate slide element. Through the arrangement of the spring and the slide element in the tangential direction and thus in the direction of the relative movement between the piston and the cover, an operating behavior characterized by extremely low wear can be obtained. In contrast, if the spring elements are formed as an integral part of the component support section, they are preferably oriented essentially in the radial direction, so that they can serve as support arms for a thrust ring, which connects the individual spring elements to each other. This thrust ring preferably cooperates with a slide device, designed essentially as a slip ring. As a result of the ring-shaped design of the thrust ring and of the slip ring, low wear can be expected during relative movement in the circumferential direction. Whereas, in the design in which a slide element is assigned to each individual spring element, there is little cutting waste of spring material and low-friction material, there are fewer components in the design with the thrust ring and the slip ring. In addition, less assembly work is required than for the design with individual spring elements, because each of these elements must be attached at one end to the component support section of the first pretensioning element mount, whereas measures must be taken at the other end to allow the permanent attachment of the slide element. When the spring elements are designed as an integral part of the component support element, however, there is no need for the previously mentioned attachment points or for the attachment of the slip ring to the thrust ring. The slip ring is therefore able to move relative to both the component support section and the piston support section, whereas, when a separate slide element is attached to each spring element, these elements accompany the movement of the component support section and are able to execute relative movement only with respect to the piston support section.

The first pretensioning element mount has a section by which it can be fastened to the cover; this fastening section is preferably attached to the cover by means of a riveting or welding procedure. This fastening section of the first pretensioning element mount is preferably followed by a transition section, which leads to the component support section; the transition section creates an axial gap between the cover and the position which the pretensioning element is intended to occupy. The transition section then leads logically to the component support section for the pretensioning element. Depending on the design and the execution of the first pretensioning element mount, this mount can serve an additional function, namely, the function of establishing a torque-transmitting connection with a disk or intermediate disk.

The second pretensioning element mount can also have a fastening section. Here, however, the fastening section is used to attach the mount to the piston. Alternatively, the second pretensioning element mount can be an integral part of the piston. If the second pretensioning element mount is attached to the piston, the attachment can be accomplished preferably by means of lock-ring bolts, because these makes it possible for the second pretensioning element mount to be attached to the piston from a preferred assembly side during the assembly procedure.

Following the area in which the second pretensioning element mount is attached to the piston, the mount has a transition section, which creates the necessary axial gap between the piston support section and the piston; the end of the transition section facing away from the attachment point then logically leads to the piston support section. The transition section of the second pretensioning element mount can be connected to at least one disk or intermediate disk so that it can serve the additional function of transmitting torque.

The support sections of the two pretensioning element mounts engage with each other in such a way that the component support section of the first pretensioning element mount projects into an area axially between the piston support section and the piston, whereas the piston support section of the second pretensioning element mount projects into an area axially between the cover and the component support section of the second pretensioning element mount. By fitting into each other in this way, the two pretensioning element mounts can hold both the tensioning element and also the slide device between them in the inventive manner.

At the point of the closest axial approach between the piston of the bridging clutch and the turbine wheel, a gap is provided, which is dimensioned so that, regardless of the conditions under which the hydrodynamic clutch device is operating, the turbine wheel and the piston will always be able to move axially with respect to each other. In particular, the goal of the gap is to prevent the turbine wheel from coming in contact with the piston during push phases, in which the turbine wheel is shifted some distance away from the pump wheel and thus moved toward the cover of the clutch device. Contact between the turbine wheel and the piston would have a disadvantageous effect on the ability to control the piston. This gap is preferably provided axially between the base of the piston and the turbine wheel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
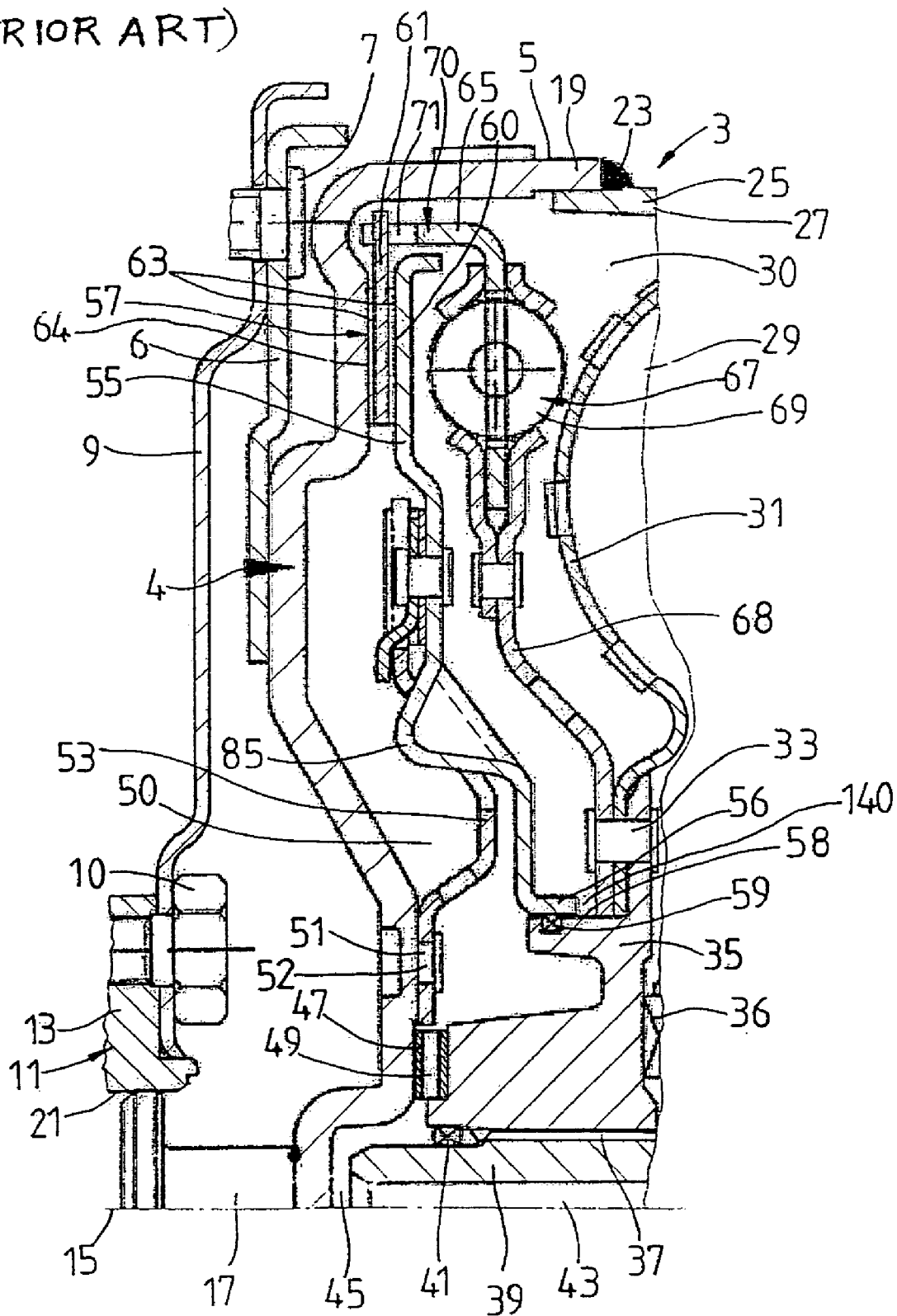
FIG. 1 is a partial longitudinal cross section through a hydrodynamic clutch device according to the prior art with emphasis on the bridging clutch.

The hydrodynamic clutch device 3 shown in FIG. 1 embodies a design known according to the state of the art. This figure is intended to represent how a bridging clutch 57 can be installed in a hydrodynamic clutch device. Reference is made to FIGS. 2–9 with respect to the design of the bridging clutch 57 according to the invention, the bridging clutch 57 being illustrated in detail in those figures and described below.

According to FIG. 1, the hydrodynamic clutch device 3 has a housing 5, to which a tie plate 6 is attached by means of a weld 4; this plate can be connected by a plurality of mounting elements 7 and a connecting element 9 such as a flexplate to a drive element 11 such as the crankshaft 13 of an internal combustion engine for rotation in common.

The clutch device 3 also has a bearing journal 17 in the area of an axis of rotation 15; this journal is provided on a cover 19 of the housing 5 and is mounted in a centering guide 21 provided on the drive element 11.

The cover 19 is permanently connected by a weld 23 to a pump wheel shell 25 of a pump wheel 27, which cooperates with a turbine wheel 29 and possibly with a stator (not shown) to form a hydrodynamic circuit 30. The turbine wheel 29 has a turbine wheel shell 31, which is fastened to a turbine hub 35 by a set of rivets 33; by way of an axial bearing the hub rests against a freewheel (not shown) of the previously mentioned stator. The turbine hub 35 has a set of teeth 37 by which it is connected for rotation in common with a gearbox input shaft 39, located radially inside the turbine hub, and has a seal 41 which seals it off against the gearbox input shaft 39. The latter is designed with a central bore 43, which leads to a transition space 45, which is connected to a pressure chamber 50 by pass-through openings 49 in a housing hub 47 located axially between the cover 19 and the turbine hub 35. The pressure chamber is located axially between the cover 19 and a piston 55 of the bridging clutch 57. The piston 55 has a piston carrier 53, which is attached to the cover 19 by a set of push-through rivets 51 to produce a nonrotatable connection 52 between the piston 55 and the cover.

The piston 55 has a base 56 in its radially inner area, by which the piston is supported on a mount 58 of the turbine hub 35, where it is also sealed by a seal 59; the radially outer area of the piston has a friction surface 60, which rests against the friction lining 63 on a disk 61; this disk 61 is able to support itself by another friction lining 63 against a friction surface 64 of the cover 19. The disk 61 is connected nonrotatably by a set of teeth 71 to an input part 65 of a torsional vibration damper 67; this input part 65 is supported by a set of circumferential springs 69 against an output part 68 of the torsional vibration damper 67. The output part 68 is attached in turn by a set of rivets 33 to the turbine hub 35. Thus, relative to the bridging clutch 57, the input part 65 of the torsional vibration damper 67 serves as the takeoff component 70 of the bridging clutch.

An axial gap 140 remains between the base 56 of the piston and the output part 68 of the torsional vibration damper 67 and the turbine wheel 29. This gap is dimensioned in such a way that, regardless of the conditions under which the hydrodynamic clutch device 3 is operating, it will always allow the turbine wheel 29 and the piston 55 to move relative to each other in the axial direction. In particular, the gap 140 is intended to prevent the turbine wheel 29 from coming into contact with the piston 55 during push phases, in which the turbine wheel 29 is shifted a certain distance away from the pump wheel 27 and thus moved toward the cover 19 of the clutch device 3. Such contact between the turbine wheel 29 and the piston 55 would have disadvantageous effects on the ability to control the piston 55.

Figure 2:
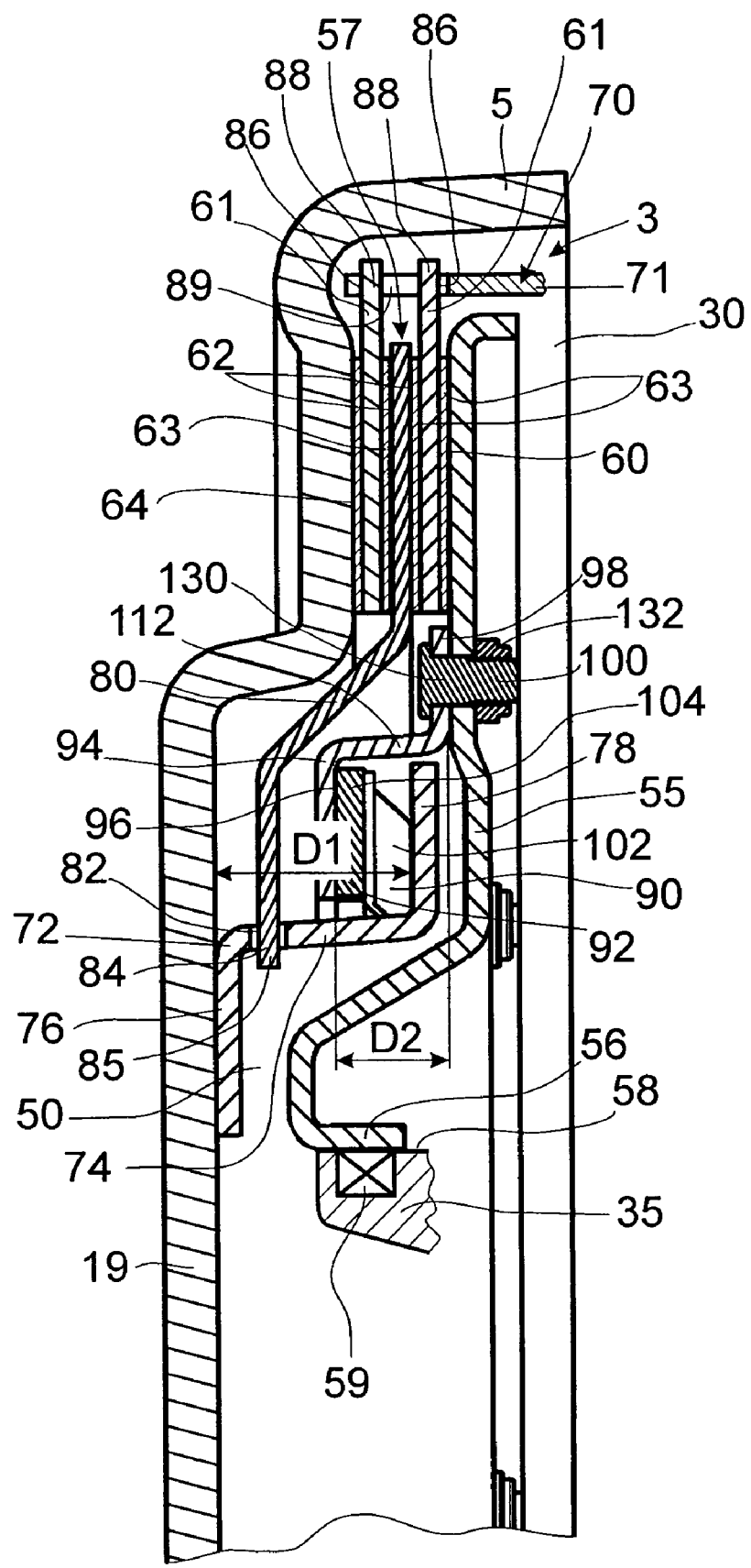
FIG. 2 shows an enlarged version of FIG. 1, but with the inventive bridging clutch with pretensioning element mounts, a pretensioning element, and a slide device radially inside the disks.

FIG. 2 shows a design of the bridging clutch 57 according to the invention. The piston 55 of this bridging clutch, as already shown in FIG. 1, is supported on the mount 58 of the indicated turbine hub 35 by way of the seal 59 and is thus held in an essentially fluid-tight manner. Axially between the piston 55 and the cover 19 of the housing 5, a first pretensioning element mount 72 is attached by a fastening section 76 to the cover 19 by means of riveting or welding (not shown), this mount being located essentially near the radially inner area of the piston 55. The essentially radially oriented fastening section 76 of the first pretensioning element mount 72 leads by way of an essentially axial transition section 74 to a component support section 78, which, like the fastening section 76, extends essentially in the radial direction. The side of component support section 78 facing away from the piston 55 accepts a plurality of spring elements 102, the design and arrangement of which within the bridging clutch 57 can be seen very clearly in FIG. 3. The spring elements 102, which act collectively as a pretensioning element 90, have at one end a first bore 127 (FIG. 3), by which they can be attached by means of a first riveted joint 126 to the component support section 78 of the first pretensioning element mount 72. The opposite ends of the spring elements 102 have second bores 129, which allow the slide elements 104 to be attached by suitable connecting means (not shown) to the spring elements. These slide elements 104 serve collectively as the slide device 92. The spring elements 102 and the slide elements 104 are preferably arranged tangentially with respect to the axis of rotation 15 (FIG. 1) of the bridging clutch 57 of the hydrodynamic clutch device 3.

The sides of the slide elements 104 facing away from the spring elements 102 are supported against a piston support section 96 of a second pretensioning element mount 94; this piston support section 96 is essentially in the shape of a ring extending in the radial direction. The piston support section 96 leads to a transition section 112, which extends essentially in the axial direction. The transition section is followed in turn by a fastening section 98 at the end facing away from the piston support section 96; the fastening section is attached by means of lock-ring bolts 100 to the piston 55. These lock-ring bolts 100 have a two-part design, namely, a rivet part 130 and a nut part 132. After the second pretensioning element mount 94 has been put in place on the piston 55, the two parts are brought into working connection with each other. These types of lock-ring bolts 100 represent advantageous connecting means for the design according to FIG. 2, but they are known in and of themselves from U.S. Pat. No. 5,826,690, which is incorporated herein by reference. The only essential point with respect to FIG. 2 is that, by means of these lock-ring bolts 100, the second pretensioning element mount 94 can be installed on the side of the piston 55 facing away from the cover 19.

The piston 55 has a friction surface 60 radially outside the pretensioning element mounts 72 and 94; by way of this surface, the piston can be brought into working connection with a first friction lining 63 of an outer disk 61, referred to in brief in the following simply as a "disk". On the side facing away from this piston 55, the disk 61 has another friction lining 63, which—forming a friction surface 62—can be brought into working connection with an intermediate disk 80, referred to in the following merely as a "disk". The disk 80 can for its own part engage by way of another friction surface 62 with another friction lining 63 of another disk 61, which can be supported by way of yet another friction lining 63 against the friction surface 64 of the cover 19. The two disks 61 have in their radially outer area radial projections 88, by means of which a nonrotatable connection 86 is established with the set of teeth 71 of the takeoff-side component 70 of the bridging clutch 57. As can be seen in FIG. 1, this takeoff-side component 70 can be, for example, the input part 65 of a torsional vibration damper 67.

At its radially inner end, the disk 80 has at least one radial projection 84, which passes through an opening 82 in the transition section 74 of the first pretensioning element mount 72 and thus is connected nonrotatably to that mount and thus also to the cover 19.

The first pretensioning element mount 72 is used for the transmission of the torque which, according to FIG. 1, arrives at the housing 5 and thus at the cover 19 from the crankshaft 13 of the drive element 11; this torque is thus transmitted via the disk 80 to the disks 61, which, as soon as a friction-locking connection exists with respect to the disk 80, conduct the torque to the takeoff-side component 70, from which it arrives in the conventional manner (see FIG. 1) at the gearbox input shaft 39. A frictional connection between the disks 61, 80 exists as soon as the bridging clutch 57 is engaged, that is, as soon as the pressure in the hydrodynamic circuit 30 that acts on the piston 55 is greater than that in the pressure chamber 50. This engagement process, during which the piston 55 is shifted toward the cover 19, occurs with the support of the pretensioning element 90, formed by the spring elements 102 provided between the support sections 78 and 96 of the pretensioning element mounts 72, 94. Because the spring elements are attached to the component support section 78, they are permanently positioned within the housing 5 of the hydrodynamic clutch device 3. Their opposite ends thus exert an axial force on the piston support section 96 of the second pretensioning element mount 94 and thus on the piston 55. From the standpoint of the piston 55, this axial force of the pretensioning element 90 is directed at the disks 61, 80 and thus at the friction surfaces 60, 62, 64 of the bridging clutch 57. Because of the short radial distance between the pretensioning element 90 and the disks 61, 80, this axial force can be transmitted to the disks 61, 80 without the danger that the piston could undergo deformation sufficient to be negatively perceived even if the piston 55 has elasticity in the axial direction. The design shown in FIG. 2, furthermore, in which the pretensioning element 90 is located together with the two pretensioning element mounts 72 and 94, radially inside the disks 61, 80 and thus radially inside the friction surfaces 60, 62, 64, guarantees the accommodation of the pretensioning element mounts 72 and 94 and the pretensioning element 90 essentially in the same axial area as that in which the disks 61, 80 are located. The design is therefore very compact in the axial direction.

The special way in which the pretensioning element 90 operates is obtained in that the component support section 78 of the first pretensioning element mount 72 fits into the space located axially between the piston 55 and the piston support section 96, this fitting space being designated by the symbol D2 in FIG. 2. Conversely, the piston support section 96 of the second pretensioning element 94 projects into an area between the component support section 78 and the cover 19, this gap being designated in FIG. 2 by the symbol D1. Arranging the two pretensioning element mounts 72, 94 in this way creates the possibility of accommodating them in the axial area between the housing 19 and the piston 55 and thus of obtaining the previously mentioned axial space advantage.

So that the bridging clutch 57 according to the invention can also be accommodated inside a hydrodynamic clutch device 3 in which there is a relative rotation, i.e. a speed differential in the circumferential direction between the cover 19 of the housing 5 and the piston 55, the slide elements 104 of the slide device 92 are provided. These slide elements can be made of a low-friction material such as PTFE or polyimide resin such as Vespel (Du Pont). As a result, a wear problem can be avoided when relative movement occurs between the cover 19 and the piston 55. The essentially tangential orientation of the spring elements 102 and thus also of the slide elements 104, which thus extend essentially in the direction of the relative movement, also helps to reduce wear.

Figure 3:
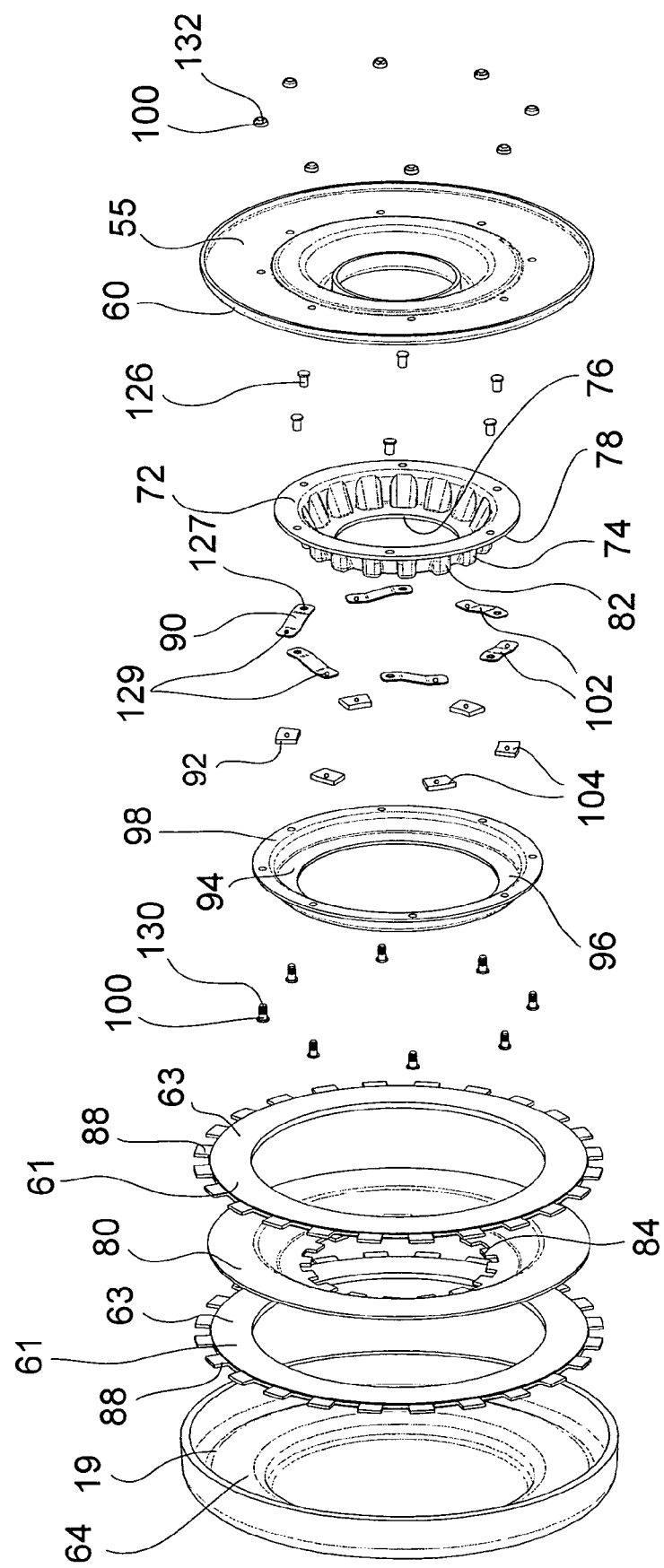
FIG. 3 is an exploded perspective view of the bridging clutch shown in FIG. 2.
Figure 4:
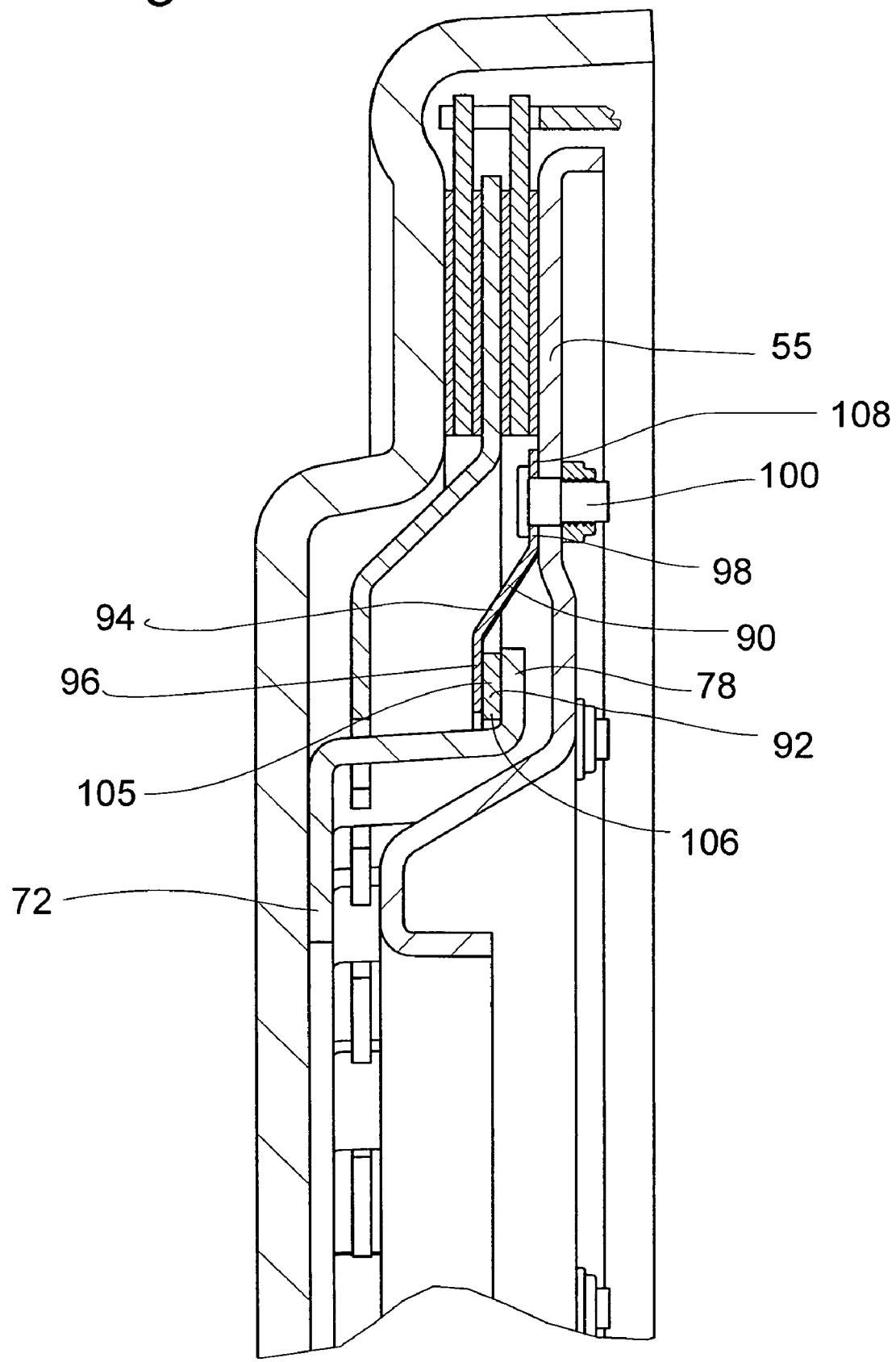
FIG. 4 is similar to FIG. 2, except that it shows a pretensioning element mount with a different design.
Figure 5:
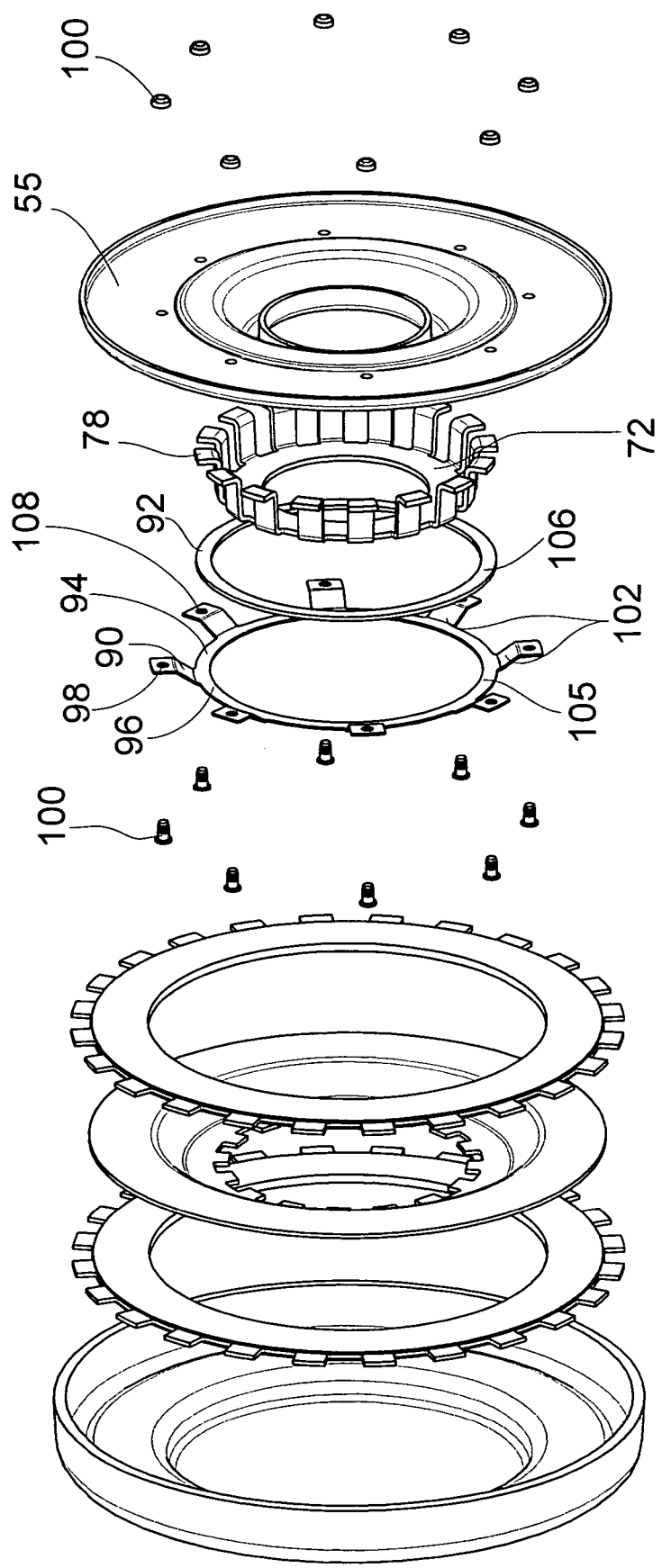
FIG. 5 is an exploded perspective view of the design according to FIG. 4.

FIGS. 4 and 5 show a modification of the design shown in FIGS. 2 and 3. The modification pertains only to the design of the second pretensioning element mount 94. For this reason, only the items which are different from those in FIGS. 2 and 3 are provided with reference numbers.

According to FIGS. 4 and 5, the second pretensioning element mount 94 is designed with a plurality of fastening sections 98, each being provided at the radially outer end of support arms 108, which extend essentially in the radial direction. All the support arms 108, which act as spring elements 102 and which serve collectively as the pretensioning element 90, lead in the radially inner area to a thrust ring 105, which takes over the function of the piston support section 96. This variant of the second pretensioning element mount 94 is again attached by lock-ring bolts 100 to the piston 55, and the side of it which faces the component support section 78 of the first pretensioning element mount 72 acts on a slide device 92, which is designed as a slip ring 106. The side of the latter which faces away from the piston support section 96 rests against the component support section 78. The slip ring 106 is able to execute relative movement in the circumferential direction versus both the component support section 78 and the piston support section 96, and, like the slide elements 104 according to the designs of FIGS. 2 and 3, is made of a material with preferred low-friction properties such as Teflon or Vespel.

Figure 6:
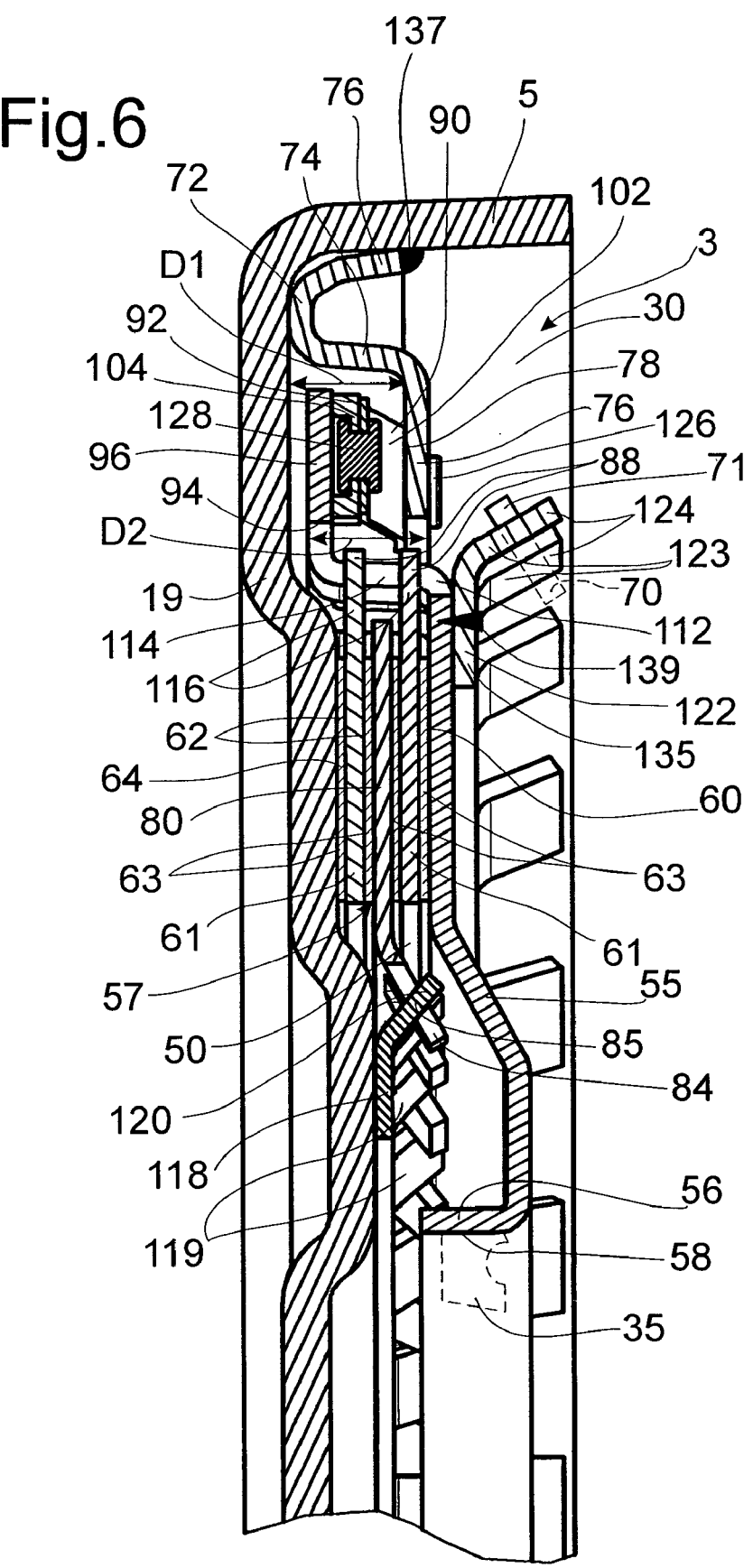
FIG. 6 is similar to FIG. 2, except that the pretensioning element mounts, the pretensioning element, and the slide device are located radially outside the disks.
Figure 7:
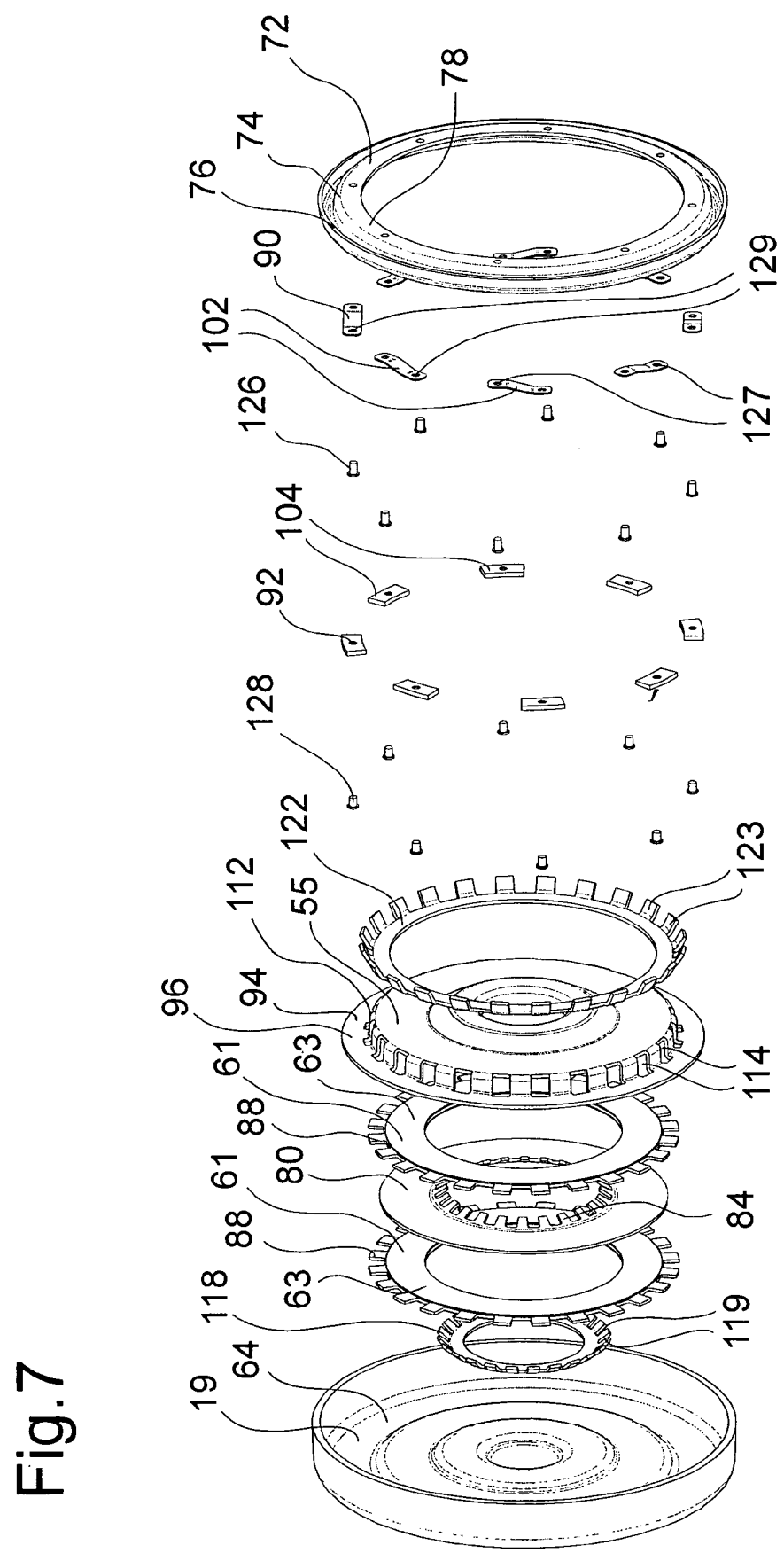
FIG. 7 is an exploded perspective view of the design according to FIG. 6.

FIGS. 6 and 7 show another design of the object of the invention. Here the first pretensioning element mount 72 is attached to the cover 19 radially outside the disks 61, 80 and thus radially outside the friction surfaces 60, 62, 64 in the housing 5, namely, by means of a radially outer fastening section 76, this section being attached by means of a weld 137 to the radially outer side of the cover 19. Following a transition section 74, there is a component support section 78 extending essentially in the radial direction. This component support section 78 is designed to accept, by means of a first set of rivets 126, a plurality of spring elements 102, serving collectively as the pretensioning element 90. The springs have appropriate first holes 127 to accept the first set of rivets 126. As also in the design according to FIGS. 2 and 3, the spring elements 102 extend essentially in a direction which is tangential to the axis of rotation 15 of the hydrodynamic clutch device 3, and at their free ends they have second holes 129, so that a second set of rivets 128 can be used to attach a slide element 104 to each spring, these slide elements 104 serving collectively as the side device 92.

The sides of the slide elements 104 which face away from the spring elements 102 rest against the piston support section 96 of the second pretensioning element mount 94, where the latter extends essentially in the radial direction and is designed as an integral part of the piston 55, to which it is connected by a transition section 112, extending preferably in the axial direction. The transition section 112 is provided with at least one opening 114, into each of which a radial projection 88 of a disk 61 fits to establish a nonrotatable connection 116 with the disk.

The disk 80 located between the two disks 61 has radial projections 84 in its radially inner area, which fit into openings in a first torque-transmitting element 118 to form a nonrotatable connection 85, these openings extending in the circumferential direction between two sets of teeth 119 of the first torque-transmitting element 118. The first torque-transmitting element is preferably welded or riveted to the cover 19.

A second torque-transmitting element 122 is attached by a weld 139 to the side of the piston 55 facing away from the disks 61, 80; this torque-transmitting element has a set of teeth 123 on the side facing away from the piston 55, by means of which a nonrotatable connection 124 can be established with the set of teeth 71 on the takeoff-side component 70.

In this design of the bridging clutch 57, a torque present at the cover 19 is conducted via the first torque-transmitting element 118 and the disk 80 to the disks 61 and from these via the transition section 112 of the second pretensioning element mount 94 to the piston 55, which, as a result of its fixed connection to the second torque-transmitting element 122, is able to transmit the torque to the takeoff-side component 70.

This torque path is completed when the bridging clutch 57 is engaged. To engage it, the pressure in the hydrodynamic circuit 30 must be higher than that in the pressure chamber 50. The displacement of the piston 55 toward the cover 19 is assisted by the spring elements 102 of the pretensioning element 90. For this reason, the piston support section 96 of the second pretensioning element mount 94 is located axially between the component support section 78 of the first pretensioning element mount 72 and the cover 19 and is acted upon by the pretensioning element 90 in the direction toward the cover 19. To compensate for any relative movements of the piston 55 with respect to the cover 19 in the circumferential direction, the slide device 92 is provided.

Geometrically, the two pretensioning element mounts 72, 94 as well as the pretensioning element 90 and the slide device 92 are located in this design radially outside the disks 61, 80 but essentially within the area over which they extend axially. In this way, too, it is possible to provide the desired axial assisting force for the piston 55 during engagement without taking up much space in the axial direction and with only short radial distance between the pretensioning element and the friction surfaces 60, 62, 64.

As also in the design according to FIGS. 2 and 3, the axial distance between the component support section 78 of the first pretensioning element mount 72 and the cover 19 is designated D1, whereas the piston support section 96 of the second pretensioning element mount 94 fits axially into the area between the component support section 78 and the cover 19 and is separated from the piston 55 by the distance D2.

Figure 8:
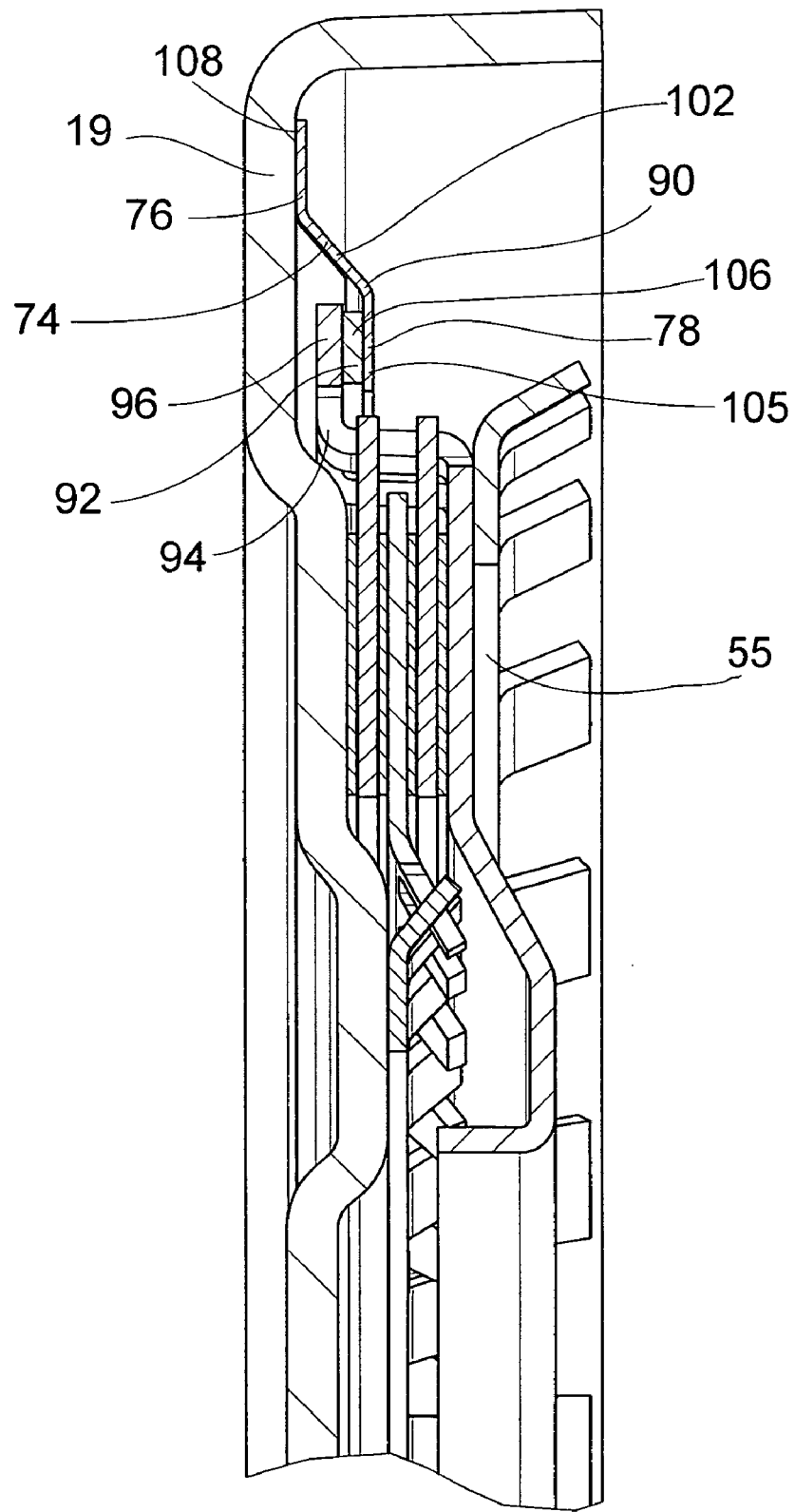
FIG. 8 is similar to FIG. 6, except that one of the pretensioning element mounts has a different design.
Figure 9:
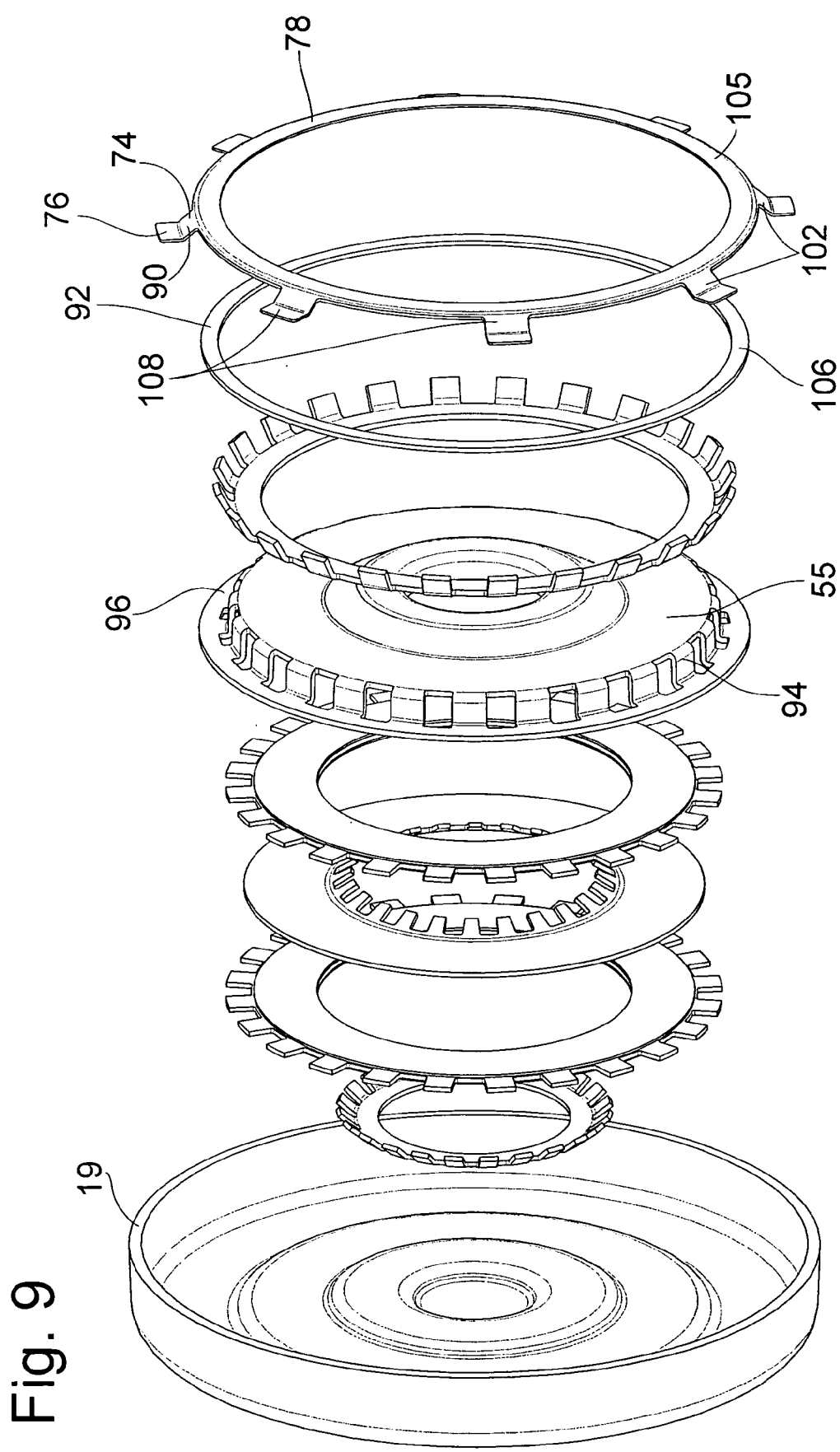
FIG. 9 is an exploded perspective view of the design according to FIG. 8.

FIGS. 8 and 9, finally, show a design which is comparable to that of FIGS. 6 and 7, except that the second pretensioning element mount 94 has a different design. This now has a plurality of spring elements 102 extending essentially in the radial direction, which are designed as support arms 108, each of which carries a fastening section 76 at its radially outer end. The radially inner ends of the support arms 108 lead to a common thrust ring 105, which acts as the component support section 78. This thrust ring 105 serves to exert force on a slide device 92 in the form of a slip ring 106, the other side of which is supported against the piston support section 96 of the second pretensioning element mount 94.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A bridging clutch for a hydrodynamic clutch device, said bridging clutch comprising:
    a housing comprising a cover having a friction surface, the housing being rotatable about an axis of rotation;
    a piston which can move axially with respect to the housing and can fully rotate with respect to the housing, the piston having a friction surface which faces the friction surface of the cover;
    a first pretensioning element mount fixed to the cover and having a first support section;
    a second pretensioning element mount fixed to the piston and having a second support section;
    a pretensioning element supported axially between said first and second support sections for actuating said piston in a predetermined axial direction wherein said friction surface of said piston is urged toward said friction surface of said cover; and
    a slide device located between said pretensioning element and said second support section for permitting sliding movement of said pretensioning element with respect to said second pretensioning element mount.

2. The bridging clutch of claim 1 wherein the pretensioning element is supported at least essentially in the axial area of the friction surfaces and radially offset from the friction surfaces.

3. The bridging clutch of claim 1 wherein the first support section faces the cover at a first axial distance from the cover, and the second support section faces the piston at a second axial distance from the friction surface on the piston.

4. The bridging clutch of claim 1 wherein the second support section lies axially between the cover and the first pretensioning element mount.

5. The bridging clutch of claim 1 wherein the slide device is fixed against rotation with respect to one of the first and second support sections.

6. The bridging clutch of claim 1 wherein the pretensioning element comprises a plurality of spring elements.

7. The bridging clutch of claim 6 wherein each said spring element has an end which is connected to one of the first and second pretensioning element mounts.

8. The bridging clutch of claim 6 wherein the slide device comprises a plurality of slide elements fixed to respective said spring elements.

9. The bridging clutch of claim 6 wherein said spring elements extend tangentially to the direction of rotation of the housing.

10. The bridging clutch of claim 6 wherein said first support section is formed by a thrust ring, said spring elements being formed as one piece with said thrust ring.

11. The bridging clutch of claim 10 wherein said spring elements extend radially from said thrust ring.

12. The bridging clutch of claim 1 wherein said slide device is a slip ring.

13. The bridging clutch of claim 1 wherein the first pretensioning element mount is fixed to the cover radially outside of the friction surfaces, the first and second pretensioning element mounts surrounding the friction surfaces.

14. The bridging clutch of claim 13 further comprising at least one friction disk located axially between said cover and said piston, and a transition section connecting the second pretensioning element mount to the piston, said at last one friction disk cooperating with said transition section to prevent rotation of said friction disk relative to said piston.

15. The bridging clutch of claim 14 comprising a plurality of friction disks between the cover and the piston, at least one intermediate disk located between the friction disks, and a first torque transmitting element fixed to the cover, said at least one intermediate disk being fixed against rotation with respect to said first torque transmitting element.

16. The bridging clutch of claim 15 wherein the first torque transmitting element comprises a plurality of teeth which form a nonrotatable connection with the at least one intermediate disk, the nonrotatable connection lying essentially within the axial area of the friction surfaces.

17. The bridging clutch of claim 15 further comprising a second torque transmitting element fixed to the piston, said clutch further comprising a take-off side component which is fixed against rotation with respect to the second torque transmitting element.

18. The bridging clutch of claim 1 wherein the first pretensioning element mount is fixed to the cover radially inside of the friction surfaces, the friction surfaces surrounding the first and second pretensioning element mounts.

19. The bridging clutch of claim 18 comprising a plurality of friction disks between the cover and the piston, and at least one intermediate disk located between the friction disks, the first pretensioning element comprising a fastening section fixed to the cover and a transition section between the fastening section and the first support section, said at least one intermediate disk cooperating with said transition section to prevent rotation of said intermediate disk with respect to said cover.

20. The bridging clutch of claim 19 further comprising a take-off side component which is fixed against rotation with respect to the friction disks within the axial area of the friction surfaces and radially outside of the friction surfaces.

21. The bridging clutch of claim 1 wherein said sliding device comprises a low-friction material which is one of Teflon and Vespel.

* * * * *